United States Patent [19]

Bracesco

[11] Patent Number: 4,979,890
[45] Date of Patent: Dec. 25, 1990

[54] APPARATUS FOR THE MANUFACTURE OF A PADDED ELEMENT, PARTICULARLY A SEAT CUSHION

[75] Inventor: Roberto Bracesco, Turin, Italy

[73] Assignee: Sicam Societa' Italiana Cuscini A. Molle S.p.A, Turin, Italy

[21] Appl. No.: 316,825

[22] Filed: Feb. 28, 1989

Related U.S. Application Data

[62] Division of Ser. No. 104,904, Oct. 6, 1987, Pat. No. 4,844,761.

[30] Foreign Application Priority Data

Oct. 6, 1986 [IT] Italy ............................... 67757 A/86

[51] Int. Cl.⁵ ..................... A01J 21/00; A01C 03/00; B32B 31/00
[52] U.S. Cl. .................................. 425/399; 425/415; 156/500; 156/581
[58] Field of Search .............. 425/407, 415, 420, 423, 425/399, 406, 412; 29/91.1; 156/290, 581, 500, 580, 583.1, 583.4; 264/553, 119, 46.5, 321

[56] References Cited

U.S. PATENT DOCUMENTS

| | | | |
|---|---|---|---|
| 4,059,660 | 11/1977 | Roth et al. | 264/46.5 |
| 4,077,821 | 3/1978 | Doerfling | 264/46.5 |
| 4,107,829 | 8/1978 | Urai et al. | 29/91.1 |
| 4,124,421 | 11/1978 | Fuji | 156/245 |
| 4,372,900 | 2/1983 | Doerfling | 264/45.3 |
| 4,405,404 | 9/1983 | Blom | 156/497 |
| 4,609,519 | 9/1986 | Pichard et al. | 264/119 |
| 4,718,153 | 1/1988 | Armitage et al. | 29/91.1 |
| 4,740,417 | 4/1988 | Tornero | 264/553 |
| 4,786,351 | 11/1988 | Elliott et al. | 425/407 |
| 4,795,517 | 1/1989 | Elliott et al. | 29/91.1 |

FOREIGN PATENT DOCUMENTS

2347160 11/1977 France .

Primary Examiner—Michael W. Ball
Assistant Examiner—Louis Falasco
Attorney, Agent, or Firm—Sughrue, Mion, Zinn, Macpeak & Seas

[57] ABSTRACT

In the manufacture of a padded element, such as a seat cushion for motor vehicles, the cushion cover of cloth, leather, synthetic material or the like is applied to the padding usually of expanded plastics material after having been formed to the shape of the surface of the padding by means of pressing in the metal die and the simultaneous application of steam. The flow of steam reaches the cover by passing through the lower part of the die and emerging from passages provided in the wall which is in contact with the material. The steam used during the operation of pressing of the material is drawn from a reservoir of pressurised steam, whose chamber is not in direct communication with the passages and whose body is of metal and is in a thermally conducting relationship with the wall of the die.

7 Claims, 2 Drawing Sheets

APPARATUS FOR THE MANUFACTURE OF A PADDED ELEMENT, PARTICULARLY A SEAT CUSHION

This is a division of application Ser. No. 104,904, filed Oct. 6, 1987, now U.S. Pat. No. 4,844,761.

BACKGROUND OF THE INVENTION

The present invention relates generally to padded elements and specifically to motor vehicle seats, and is particularly concerned with a method for the manufacture of cushions for such seats, wherein a cover is applied to a padding having a shaped surface and formed into a configuration complementary to the shaped surface of the padding.

In the present description and in the claims which follow, the term "cushion" refers to the part of the seat constituting the seat squab or even the backrest and formed from padding (for example of expanded plastics material) provided with a cover (of cloth, leather, synthetic material or the like) possibly provided on its inside with a relatively thin, soft layer of expanded plastics material.

According to one known technique, the cushion is produced by providing padding of expanded plastics material and covering this padding with cloth on the upper surface of the cushion and on a perimetral strip arranged at the front and on the two sides of the cushion. The cloth cover is fixed to the padding with adhesive material or with fixing elements which attach the cloth to the body of expanded plastics material.

Compared to more conventional techniques in which the cloth cover is attached to the body of expanded plastics material by means of sewing, the above known technique has the advantage of being more suitable for mass production and, in particular, of allowing the manufacturing process to be automated, whilst still enabling the production of anatomically complex shapes in accordance with the requirements of ergonomics and comfort. On the other hand, this known method involves the risk that, as a result of the attachment of the cloth cover to the anatomical upper surface of the padding, tears may form in the cloth since it is not elastic.

In order to solve this problem, the use of a thermoformable material has been suggested for covering the padding of expanded plastics material. This material is first heated and then formed into the required shape by means of cold pressing in a die. The material thus shaped is then attached to the body of expanded plastics material. This known method, however, has the disadvantage of requiring the use of a thermoformable material, which is relatively expensive, and of not permitting the use of materials bearing decorative designs, as the designs are deformed during the thermoforming operation.

A solution to the problem of producing a cushion with a complex anatomical shape, using a normal non-elastic material for the cover but nevertheless avoiding the risk of splitting and/or tearing of the material during its attachment to the stuffing, consists of forming the covering material before its application to the padding by means of a hot pressing operation with the application of steam. A method of this type is described and illustrated in the documents FR-A-2 347 306. Although, on the one hand, the simple idea of giving a non-elastic material a certain shape by means of hot pressing in the presence of steam certainly constitutes an obvious step for an expert in the art of forming materials, in view of the fact that it is the conventional method used, even in the home, for shaping articles of clothing as well as covering materials in general, it should be appreciated, on the other hand, that the practical application of this idea on an industrial scale is not at all immediate. In fact, experiments conducted by the Applicant have shown that the method mentioned above, as described in FR-A-2 347 306, cannot, in practice, be used industrially, as it involves a high risk that some of the steam which is applied during pressing of the material will condense on the material, giving rise to blemishes.

SUMMARY OF THE INVENTION

The object of the present invention is to overcome the above problem by means of a method which is both simple and economical.

In order to achieve this object, the subject of the invention is a method for the manufacture of a padded element, particularly, but not exclusively, a seat cushion in which a cover is applied to a padding after having been formed into the shape of the surface of the padding by means of pressing in a die and the simultaneous application of a flow of steam which passes through a lower part of the die and reaches the cover through passages defined in the upper wall of the lower part of the die, wherein the steam used during the stage of pressing of the cover is brought to the passages formed in the upper wall by being drawn from a reservoir of pressurized steam whose chamber is not in direct communication with the passages and whose body is in a thermally conducting relationship with the upper wall of the lower part of the die.

In the method according to the invention, during the forming stage, the risk of the formation of condensation and consequent blemishes on the material is reduced to the minimum, as the upper wall of the lower part of the die is kept efficiently and constantly at a high temperature by virtue of the heat transfer which occurs by thermal conduction from the body of the steam reservoir to the upper wall. At the same time, prolonged contact of the steam with the material is avoided, as the chamber of the pressurized steam reservoir is not in direct communication with the passages formed in the upper wall.

After forming of the covering material, the latter is applied to the padding of expanded plastics material in the usual way, by means of gluing with a two-component adhesive and pressing the padding against the material and against the lower part of the die. A further preferred characteristic of the method according to the invention lies in the fact that the first component of the adhesive is deposited on the padding before it is pressed against the material, whilst the second component of the adhesive is applied during the pressing stage by passing it through the passages formed in the wall of the die which is in contact with the material, and through the pores of the material.

In this way, a particular problem of known methods in which the two components of the adhesive are both deposited on the padding immediately before application of the covering material is avoided; this problem consisting of the fact that the pressing stage must be carried out within a relatively short time after the application of the two components of the adhesive, so that the reaction between the two components is not completed before the padding is pressed against the covering material.

By virtue of the characteristic indicated above, however, the first component of the adhesive may be applied to the padding a long time before the moment at which the operation of pressing it against the covering material is carried out, which enables several paddings already covered with the first component to be stored. The second component, as already specified, is then added at the moment of pressing in the die.

In the specific case in which the second component is constituted by a mixture of water and a catalyst, this may be applied by taking a flow of steam from the pressurized steam reservoir with which the die is provided and inserting the reagent into the flow of steam upstream of the passages formed in the wall of the die which is in contact with the material. In this way, the flow of steam from the reservoir draws the catalyst through the passages formed in the die and the pores of the covering material, until it comes into contact with the padding where it reacts with the first component of the adhesive to cause adhesion of the material to the padding.

According to a further aspect, a subject of the invention is an apparatus for use in the manufacture of a padded element, particularly but not exclusively, a seat cushion, comprising a die for pressure forming a cover intended to be applied to a padding into the shape of the surface of the padding, the die having an upper part and a lower part of which at least the lower part has passages defined in the wall intended to come into contact with the cover, and means for supplying a flow of steam to the passages defined in the wall pressing of the cover so as to enable the cover to be formed into the required shape, wherein the means for supplying the steam comprise a reservoir of pressurized steam whose chamber is not in direct communication with the passages formed in the wall of the die and whose body is in the thermally conducting relationship with the wall of the die.

A further characteristic of the apparatus according to the invention lies in the fact that a duct for the supply of a reagent intended, with water, to constitute the second component of the adhesive which is used for gluing the material to the padding of the seat leads into the duct which connects the pressurized steam reservoir to the auxiliary chamber, in a region downstream of the shut-off valve. During the stage of pressing the padding against the previously formed covering material, the shut-off valve associated with the steam reservoir is open so as to generate a flow of steam towards the material and, at the same time, a pump for supplying the reagent into the duct through which the steam flows is activated so as to enable the reagent to be drawn by the steam and deposited on the padding, which it reaches by passing through the auxiliary chamber, the passages formed in the wall of the die in contact with the material, and the pores of the material.

BRIEF DESCRIPTION OF THE DRAWINGS

Further characteristics and advantages of the invention will become clear from the description which follows with reference to the appended drawings, provided purely by way of non-limiting example, in which.

DETAILED DESCRIPTION OF THE INVENTION

Figure 1:
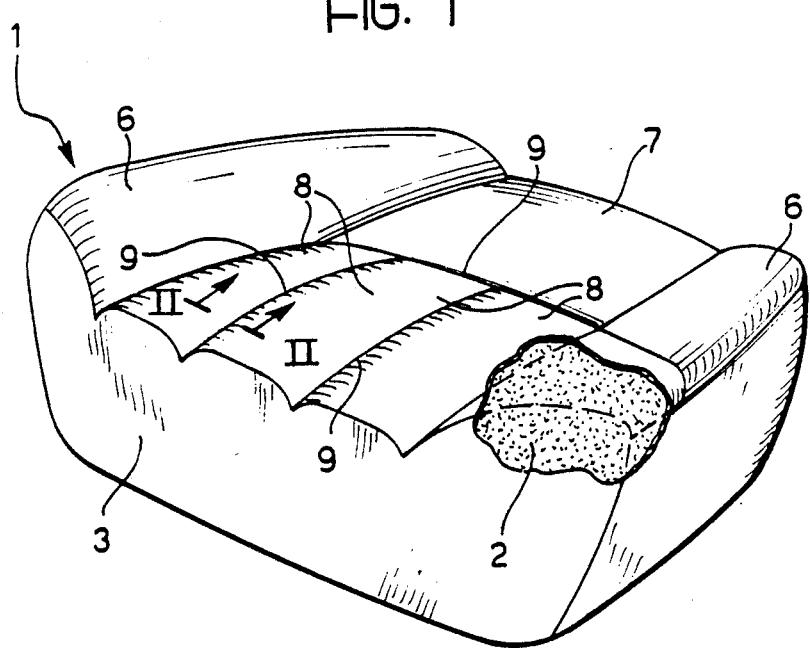
FIG. 1 is a perspective view of a seat cushion for motor vehicles.
Figure 2:
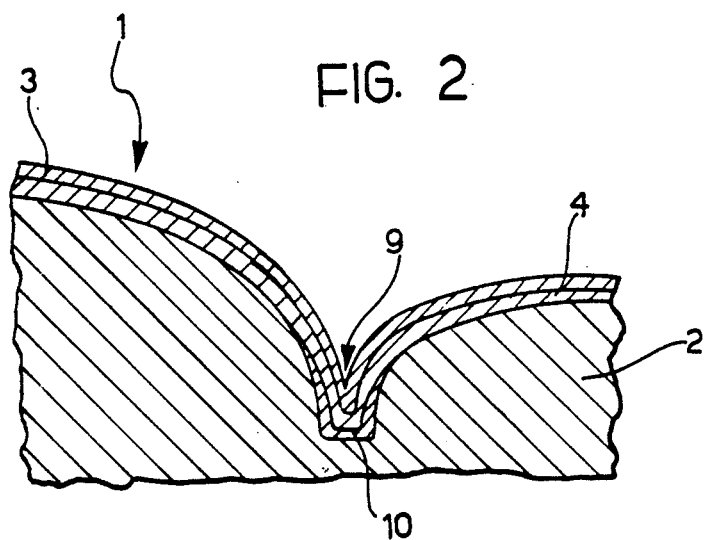
FIG. 2 is a section taken on the line II—II of part of the cushion of FIG. 1 on an enlarged scale.

With reference to FIGS. 1 and 2, the cushion of a seat for motor vehicles, in this particular case, the seat squab, is generally indicated 1. The cushion 1 comprises a padding of expanded plastics material 2 covered with a material 3 which, in the case of the example illustrated, is provided on its inside with a thin, soft layer 4 of expanded plastics material. In order to obtain optimal support of the body of the seated person, the upper surface of the padding 2 is formed into a three-dimensional surface shape with surface portions 6, 7 and 8 which are separated from each other by indentations 9. The covering material 3 has a main part which is attached to the upper surface of the padding 2 and a perimetral strip extending over the front and the two sides of the cushion.

In the cushion produced by the method according to the invention, the main part of the covering material is attached to the padding of expanded plastics material by a layer of adhesive material 10 deposited at least in correspondence with the indentations 8, 9 by a technique which will be described in detail below.

Figure 3:
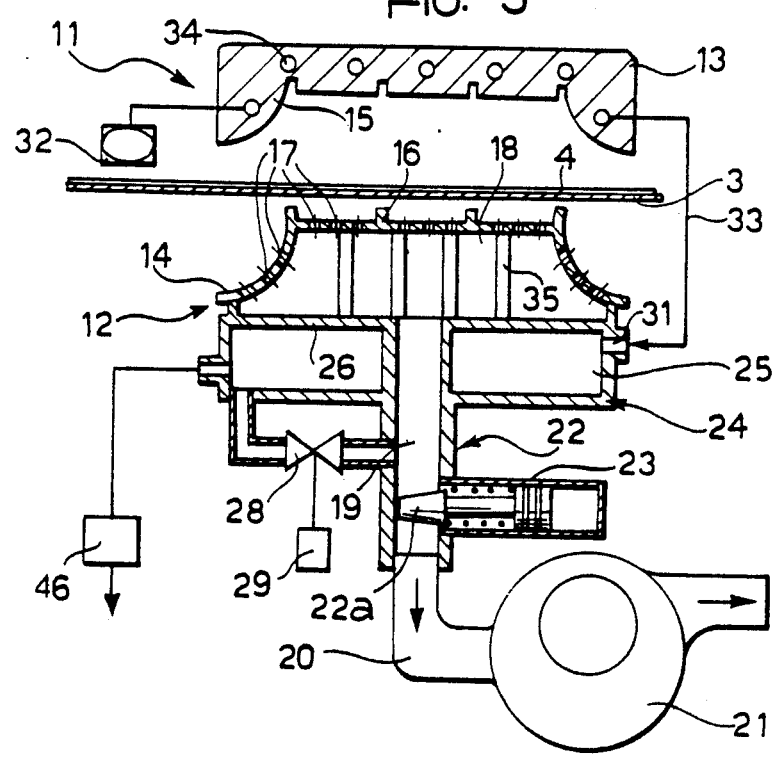
FIGS. 3 and 4 are schematic sectional views of the apparatus used in the manufacture of the cushion of FIG. 1, illustrated in two different stages of the method.

According to the invention, the covering material 3, together with any inner layer of expanded material 4, is formed to the required shape before its application to the padding 2. The material is formed by hot pressing in the presence of steam in a die 11 (FIG. 3) comprising a lower part 12 and an upper part 13 having operating surfaces 14, 15 which have a profile corresponding to the shape of the upper surface of the padding 2. Both the parts 12, 13 are constituted, for example, by metal or heat-resistant plastics material. The lower part 12 has, in its upper wall 16, a series of passages 17 communicating with a chamber 18 formed within the body of the lower part 12 of the die. The chamber 18 communicates through a duct 19 and a duct 20 with a vacuum source 21 constituted, in the example illustrated, by a centrifugal pump. As will be explained in detail below, the pump 21 is used to suck the material against the wall 16 so as to keep it in the correct position. Since the material has a certain porosity, however, it is necessary for the centrifugal pump 21 to have a relatively high capacity sufficient, in any case, to ensure suction of the material against the wall 16. The obturator 22a of a shut-off valve 22 is interposed in the duct 19 and is used to control communication between the chamber 18 and the pump 21. The valve 22, in the example illustrated, is driven by a pneumatic cylinder 23 whose supply is controlled by electrical means (not illustrated) according to a technique known to experts in the art.

A pressurized steam reservoir 24 is also formed in the lower part 12 of the die and has, in the example illustrated, an annular chamber 25 surrounding the duct 19. The upper wall 26 of the reservoir defines the bottom of the chamber 18. As can be seen from the drawings, the chamber of the reservoir 24 is not in direct communication with the chamber 18 and the passages 17. A duct 27 is provided which puts the chamber 25 into communication with the duct 19 through a shut-off valve 28 (illustrated only schematically in FIGS. 3 and 4) controlled by an electromagnetic actuator 29 (also illustrated only schematically). The structure of the valve 28, the actuator 29, and the means for controlling the actuator 29 are not illustrated in the appended drawings, since they may be of any known type and the elimination of these details from the drawings enables the latter to be understood more quickly and easily. The reservoir 24 is further provided with an outlet 30 communicating with a valve 46 for draining the condensation which forms in the chamber 25, as well as an inlet 31 for admitting the steam. The steam reaches the inlet 31 from a source of pressurized steam 32 through a duct 33 and, preferably, after having flowed through a passage 34 formed in the upper part 13 of the die, so as to heat the part 13.

In order to form the covering material 3, 4, this material is first laid on the wall 16 of the lower part 12 of the die and not held in position by automated mechanical means (not illustrated).

Inside the lower part 12 of the die are metal elements 35 which, in the example illustrated, are in the form of pillars uniformly distributed over the whole area of the wall 26, and which provide a thermally conducting support between this wall and the upper wall 16 of the die. It should be appreciated that the metal elements 35, however they are produced, do not divide the chamber 18 into separate compartments, but are used solely to enable the transfer of heat from the wall of the pressurized steam reservoir to the upper wall of the die, so as to enable this upper wall to be kept constantly at a high temperature.

Once the material has been positioned against the upper wall 16, the upper part 13 of the die is lowered and pressed onto it. Simultaneously, the valve 28 is opened. In this way, a flow of pressurized steam is created through the duct 27, the duct 19, and the chamber 18 to the passages 17 formed in the upper wall 16 of the lower part 12 of the die. The pressurized steam emerges from the passages 17 and reaches the material, enabling it to be formed into the required shape. As can be seen, optimal forming can be achieved, since it is carried out by means of hot pressing in the presence of steam, without the risk of splitting or tearing of the material, even when the material is to be given a complex shape.

During this forming stage, the risk of the formation of condensation and consequent blemishes on the material is reduced to a minimum, as the upper wall of the lower part of the die is kept efficiently and constantly at a high temperature by virtue of the transfer of heat which takes place by thermal conduction from the body of the steam reservoir to the upper wall. At the same time, prolonged contact of the steam with the material is avoided, due to the fact that the chamber of the pressurized steam reservoir is not in direct communication with the passages formed in the upper wall.

Once the forming of the material has been carried out, the valve 28 is closed, the valve 22 is opened, and the pump 21 is simultaneously activated to keep the material in position while the upper part 13 of the die is raised. In this way, removal of any residual steam from the chamber 18 is also achieved.

Figure 4:
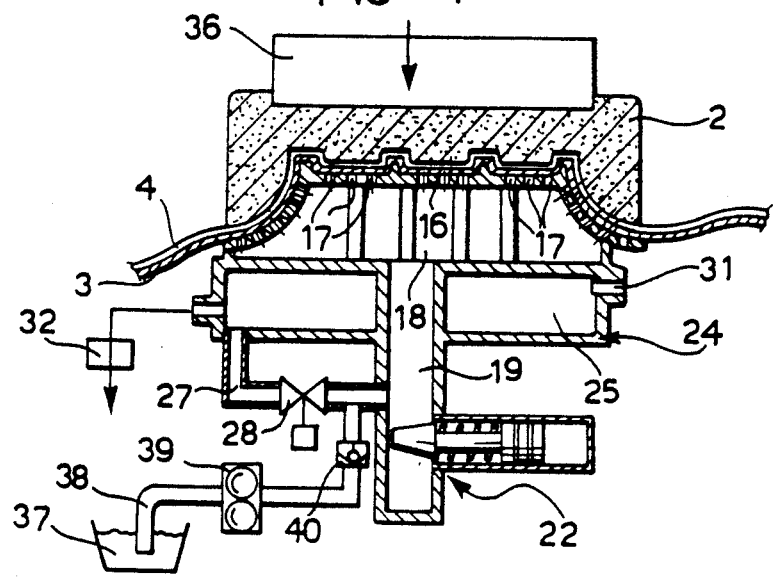

In a succeeding stage of the method, the padding of expanded plastics material 2 is applied to the inside of the covering material and glued onto it by pressure from a thrust member 36 (FIG. 4). As can be seen, only the main part of the covering material is glued to the padding 2, while the perimetral strip for covering the front and sides of the padding remains outside the die.

The padding 2 may be glued to the inside of the cover according to the technique usually employed up to now, that is, by covering the upper surface of the padding 2 with a layer of adhesive 10 (FIG. 2) before it is applied against the material. The adhesive may be applied to the whole upper surface of the padding, or only in correspondence with the indentations 8,9 of the padding. In the first case, the adhesive may be applied by means of a roller, whilst in the second case a spraying device, possibly carried by a robot if the process for manufacturing the seats is automated, is preferable. According to the usual technique, the adhesive has two components which are combined immediately before application. However, this technique has the problem that the operation of pressing the padding against the inside of the material must be carried out within a relatively short time from the moment when the two components of the adhesive are combined, so that the reaction between the components is not completed before the padding is applied to the material.

In order to avoid this problem, the method according to the invention preferably has a further characteristic which consists of the fact that, before the operation of pressing the padding 2 onto the material, a layer of only the first component of the adhesive (usually a polyurethane prepolymer) is applied to the upper surface of the padding. The second component of the adhesive, which acts as a catalyst, is usually constituted by a mixture of water and aromatic amines and is applied during the pressing of the padding onto the inside of the material, in the manner which is described in detail below.

With reference to FIG. 4, a container 37 is provided for the product intended to constitute, together with water, the second component of the adhesive. The container 37 communicates with the duct 27, in a region downstream of the valve 28, through a duct 38 in which a supply pump 39 and a non-return valve 40 are arranged.

During the pressing of the padding 2 against the inside of the material 3, 4, the valve 28 is opened to create a flow of steam towards the material through the duct 27, the valve 28, the passage 19, the chamber 18, and the duct 17 formed in the wall 16. At the same time, the pump 39 is activated to introduce the catalyst coming from the container 37 into the flow of steam passing through the duct 27. The pump 39 must be able to overcome the pressure of the steam in the duct 27, so as to enable the catalyst to be introduced into the flow of steam. At the same time, the valve 40 prevents the steam from flowing towards the container 37. The flow of the mixture of steam and catalyst is thus sent to the material and reaches the upper surface of the padding by passing through the pores of the material. The reaction between the two components of the adhesive thus occurs during the operation of pressing the padding 2 against the material. It is clear that this method provides the advantage that it is not necessary to start the pressing operation within a very short time after the padding 2 has been prepared.

I claim:

1. An apparatus for use in the manufacture of a padded element comprising:
 a die for pressure forming a cover intended to be applied to a padding into a shape complementary to a surface of the padding, said die having an upper part and a lower part with said lower part having a wall with passages intended to come into contact with the cover; and
 means for supplying steam to the passages during pressing of the cover between said upper and lower parts so as to enable the cover to be formed into said shape;
 wherein said means for supplying steam comprises a reservoir having a body defining a chamber for pressurized steam and duct means indirectly communicating said reservoir chamber with said passages formed in said wall of said die and wherein said body is connected to said wall by thermally conducting means to maintain said wall of said die in a heated condition to prevent condensation of steam thereon.

2. An apparatus according to claim 1, wherein said wall of said die defines an auxiliary chamber which is connected to said reservoir chamber by said duct means including a first duct provided with a shut-off valve.

3. An apparatus according to claim 2, wherein said auxiliary chamber communicates with a vacuum source through a duct in which a further shut-off valve is interposed.

4. An apparatus according to claim 1, wherein said reservoir chamber has an inlet connected to a source of pressurized steam through a duct, the upper part of the die defining an internal passage which is interposed in said duct between said source of pressurized steam and said reservoir.

5. An apparatus according to claim 1, wherein said upper wall and said body of said pressurized steam reservoir are in one piece, said reservoir having an upper wall arranged below and spaced from the upper wall of said die and wherein said reservoir chamber is an annular chamber surrounding a central duct which in turn communicates with the duct in which the shut-off valve is interposed.

6. An apparatus according to claim 2, further comprising a container for a catalyst for an adhesive which is used for gluing the padding to the cover;
   a further duct connecting said container with said duct connecting said reservoir chamber to said auxiliary chamber; and
   a supply pump interposed in said further duct.

7. An apparatus according to claim 6, wherein a non-return valve is interposed in said further duct downstream of said pump to prevent steam from flowing towards said container.

* * * * *